United States Patent
Kumar Skand Priya

(10) Patent No.: US 11,588,687 B2
(45) Date of Patent: Feb. 21, 2023

(54) SYSTEM AND METHODS FOR AUTOMATING SLICE CONFIGURATION DESIGN AND PROVISIONING

(71) Applicant: Verizon Patent and Licensing Inc., Basking Ridge, NJ (US)

(72) Inventor: Viswanath Kumar Skand Priya, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/198,921

(22) Filed: Mar. 11, 2021

(65) Prior Publication Data

US 2022/0294691 A1 Sep. 15, 2022

(51) Int. Cl.
*G06F 15/177* (2006.01)
*H04L 41/0813* (2022.01)
*G06F 8/60* (2018.01)

(52) U.S. Cl.
CPC ............ *H04L 41/0813* (2013.01); *G06F 8/60* (2013.01)

(58) Field of Classification Search
CPC .............................. H04L 41/0813; G06F 8/60
See application file for complete search history.

(56) References Cited

U.S. PATENT DOCUMENTS

| | | | |
|---|---|---|---|
| 2009/0228867 A1* | 9/2009 | Bandyopadhyay | G06F 8/71 717/121 |
| 2010/0180270 A1* | 7/2010 | Williams | G06F 8/65 717/174 |
| 2012/0323624 A1* | 12/2012 | Bernardini | G06Q 10/0639 705/7.11 |
| 2018/0132138 A1* | 5/2018 | Senarath | H04L 47/78 |
| 2022/0053375 A1* | 2/2022 | Asawa | H04L 41/145 |

* cited by examiner

*Primary Examiner* — John B Walsh

(57) ABSTRACT

Systems and methods described herein enable a slice orchestration platform to provide flexibility for network function (NF)-type specific configuration generation workflow without sacrificing automation of design and deployment. According to one implementation, a network device stores workflows for Configuration Information Questionnaire (CIQ) automation; receives a vendor network function (NF) package; obtains site information for an instance of the vendor NF; generates site-specific artifacts for the NF package based on the workflows and the site information; and associates the site-specific artifacts with a configuration design for the NF package.

20 Claims, 7 Drawing Sheets

SYSTEM AND METHODS FOR AUTOMATING SLICE CONFIGURATION DESIGN AND PROVISIONING

BACKGROUND

A Fifth Generation (5G) core network supports and manages 5G radio access networks (RANs) that include base stations, providing various services and enabling connections to other networks (e.g., connections to the Internet, etc.). Different types of services may be implemented using network slicing. Network slicing is a form of virtual network architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources and may be configured to implement a different set of requirements. In order to implement functionality such as network slicing, a 5G core network may include various network nodes, known as network functions (NFs). As the number of different NF types and deployed instances of each NF continues to increase, the use of virtualized NFs (VNFs) has become more prevalent.

DETAILED DESCRIPTION OF THE PREFERRED EMBODIMENTS

The following detailed description refers to the accompanying drawings. The same reference numbers in different drawings may identify the same or similar elements.

Software-defined networking (SDN) and/or network function virtualization (NFV) may allow network functions (NFs) of a wireless telecommunications network to execute from reconfigurable resources of function-agnostic hardware.

Systems and methods described herein provide for automating slice configuration design and provisioning in a 5G slice orchestration platform. The systems and methods provide flexibility for NF-type specific configuration generation workflow without sacrificing the automation of design and deployment. According to one implementation, options to perform an "Instance-Specific Configuration Design" and "Deployment-Agnostic Slice Design" are provided. The Instance-Specific Configuration Design option may include pre-planned configuration generation for a slice. The Deployment-Agnostic Slice Design may include on-demand configuration generation for a slice provisioning. According to another implementation, a slice design tool may host a generalized configuration database for runtime slice orchestration components to resolve NF and slice configuration on-demand during NF instantiation. Thus, systems and methods described herein can enable dynamic slice instantiation in SDN environments.

Figure 1:
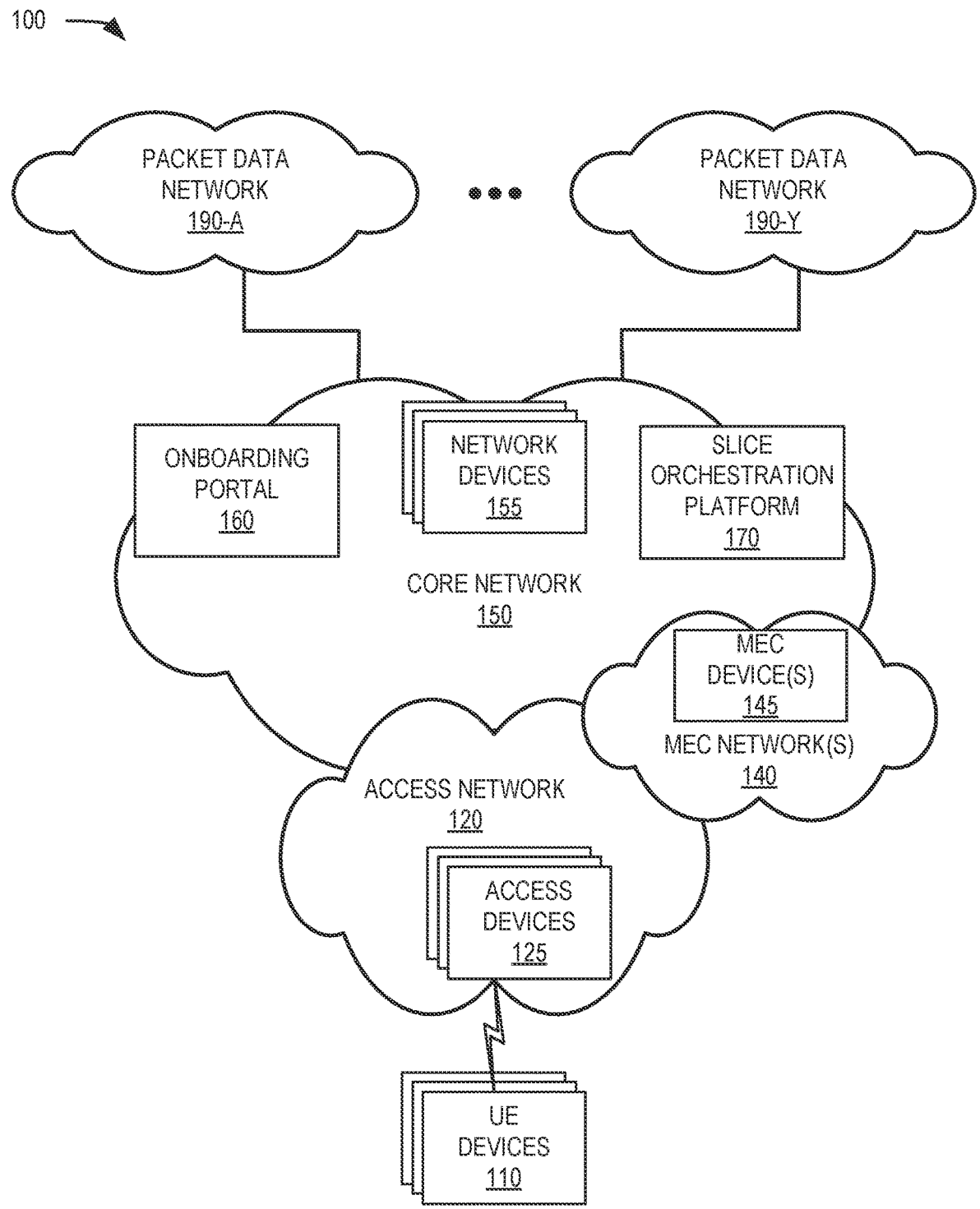
FIG. 1 is a diagram illustrating an exemplary network environment in which an automated slice configuration service described herein may be implemented.

FIG. 1 is a diagram of an exemplary environment 100 in which the systems and/or methods, described herein, may be implemented. As shown in FIG. 1, environment 100 may include UE devices 110, a radio access network (RAN) 120 that includes access devices 125, multi-access edge computing (MEC) network(s) 140 that include MEC device(s) 145, a core network 150 that includes network device(s) 155, an onboarding portal 160, and a slice orchestration platform 170, and packet data networks (PDNs) 190-A to 190-Y (referred to herein collectively as "PDNs 190" and individually as "PDN 190").

UE device 110 may include a device with cellular wireless communication functionality. For example, UE device 110 may include a handheld wireless communication device (e.g., a smart phone, etc.), a wearable computer device (e.g., a wristwatch computer device, etc.), a computer; a WiFi access point, a portable gaming system, an Internet-of-Things device, and/or any other type of computer device with wireless communication capabilities. UE device 110 may include capabilities for voice communication, mobile broadband services (e.g., video streaming, real-time gaming, premium Internet access etc.), best effort data traffic, and/or other types of applications.

Access device 125 may include a 5G New Radio (NR) base station (e.g., a gNodeB) and/or a Fourth Generation (4G) Long Term Evolution (LTE) base station (e.g., an eNodeB). Each access device 125 may include devices and/or components configured to enable cellular wireless communication with UE devices 110. For example, access device 125 may include a radio frequency (RF) transceiver configured to communicate with UE devices using a 5G NR air interface using a 5G NR protocol stack, a 4G LTE air interface using a 4G LTE protocol stack, and/or using another type of cellular air interface. Access device 125 may enable communication with core network 150 to enable core network 150 to authenticate UE device 110.

Access network 120 may enable UE devices 110 to connect to core network 150 via access devices 125 using cellular wireless signals. For example, access network 120 may include one or more central units (CUs) and distributed units (DUs) (not shown in FIG. 1) that enable and manage connections from access device 125 to core network 150. Access network 120 may include features associated with an LTE Advanced (LTE-A) network and/or a 5G core network or other advanced network, such as management of 5G NR base stations; carrier aggregation; advanced or massive multiple-input and multiple-output (MIMO) configurations (e.g., an 8×8 antenna configuration, a 16×16 antenna configuration, etc.); relay stations; Heterogeneous Networks (HetNets) of overlapping small cells and macrocells; Self-Organizing Network (SON) functionality; Machine-type Communications (MTC) functionality, such as 1.4 Megahertz (MHz) wide enhanced MTC (eMTC) channels (also referred to as category Cat-M1), Low Power Wide Area (LPWA) technology such as Narrow Band (NB) IoT (NB- IoT) technology, and/or other types of MTC technology; and/or other types of LTE-A and/or 5G functionality.

Each MEC network 140 may be associated with one or more access devices 125 and may provide MEC services for UE devices 110 attached to the one or more access devices 125. MEC network 140 may be in proximity to the one or more access devices 125 from a geographic and network topology perspective, thus enabling low latency communication with UE devices 110 and/or access devices 125. As an example, MEC network 140 may be located on a same site as one of the one or more access devices 125. As another example, MEC network 140 may be geographically closer to the one or more access devices 125, and reachable via fewer network hops and/or fewer switches, than other access devices 125 and/or packet data networks 190. As yet another example, MEC network 140 may be reached without having to go through a gateway device, such as a 4G Packet Data Network Gateway (PGW) or a 5G User Plane Function (UPF).

MEC network 140 may include one or more MEC devices 145. MEC devices 145 may provide MEC services to UE devices 110, such as, for example, content delivery of streaming audio and/or video, cloud computing services, authentication services, etc. In some implementations, MEC devices 145 may host deployed VNFs used to implement particular network slices. Thus, MEC devices 145 may form part of an infrastructure for hosting network slices.

Core network 150 may be managed by a provider of cellular wireless communication services and may manage communication sessions of subscribers connecting to core network 150 via access network 120. For example, core network 150 may establish an Internet Protocol (IP) connection between UE devices 110 and PDN 190. In some implementations, core network 150 may include a 5G core network. A 5G core network may include devices that implement network functions that include, among others, an Access and Mobility Function (AMF) to perform registration management, connection management, reachability management, mobility management, and/or lawful intercepts; a Session Management Function (SMF) to perform session management, session modification, session release, IP allocation and management, Dynamic Host Configuration Protocol (DHCP) functions, and selection and control of a UPF; a UPF to serve as a gateway to packet data network 190, act as an anchor point, perform packet inspection, routing, and forwarding, perform Class of Service (CoS) handling in the user plane, uplink traffic verification, transport level packet marking, downlink packet buffering, and/or other type of user plane functions; an Application Function (AF) to provide services associated with a particular application; a Unified Data Management (UDM) to manage subscription information, handle user identification and authentication, and perform access authorization; and a Network Slice Selection Function (NSSF) to select a network slice instance to serve a particular UE device 110. In other implementations, core network 150 may also include a 4G LTE core network (e.g., an evolved packet core (EPC) network).

Core network 150 may include network device(s) 155. Network device 155 may include a 5G NF; a 4G network node; a transport network device, such as, for example, a switch, router, firewall, gateway, an optical switching device (e.g., a reconfigurable optical add-drop multiplexer, etc.), and/or another type of network device. Network device 155 may include a physical function node or a VNF. Thus, the components of core network 150 may be implemented as dedicated hardware components and/or as VNFs implemented on top of a common shared physical infrastructure using Software Defined Networking (SDN). For example, an SDN controller (e.g., in slice orchestration platform 170) may implement one or more of the components of core network 150 using an adapter implementing a VNF virtual machine, a Containerized Network Function (CNF), an event driven serverless architecture interface, and/or another type of SDN architecture. The common shared physical infrastructure may be implemented using one or more devices 600 described below with reference to FIG. 6 in a cloud computing center associated with core network 150. Additionally, or alternatively, some, or all, of the common shared physical infrastructure may be implemented using one or more devices 600 included in MEC device 145. Sets of network devices 155 and/or MEC devices 145 may be organized, for example, into different network slices.

Onboarding portal 160 may include one or more computer devices, such as server devices, to process orders for network services. For example, a customer, such as a business, organization, and/or government entity may request a service for which a new network slice is to be deployed. As an example, a business may request a communication service associated with a quality of service (QoS) and may request data traffic separation for the service, resulting in onboarding portal 160 sending a request (such as a request to admit a new network slice in core network 150 and/or access network 120) to slice orchestration platform 170.

Slice orchestration platform (SOP) 170 may include one or more computer devices, such as server devices, to design and orchestrate network slices in core network 150 and/or access network 120. Slice orchestration platform 170 may include logic for designing, testing, deploying, and adapting network slices. For example, slice orchestration platform 170 may determine whether a particular network slice should be admitted and deployed on a particular infrastructure. Slice orchestration platform 170 may admit a network slice based on requirements associated with the network slice, based on an estimated load associated with the network slice, and/or based on a projected load for resources required to implement the network slice. Furthermore, in some implementations, slice orchestration platform 170 may determine whether a VNF instance in core network 150 is to be created, deleted, and/or modified.

PDNs 190 may each include a data network. A particular PDN 190 may be associated with an Access Point Name (APN) and UE device 110 may request a connection to the particular packet data network 190 using the APN. PDN 190 may include, and/or be connected to and enable communication with, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100. For example, while onboarding portal 160 and slice orchestration platform 170 are shown as separate systems in FIG. 1, in other implementations, slice orchestration platform 170 may include and/or be combined with onboarding portal 160.

Figure 2:
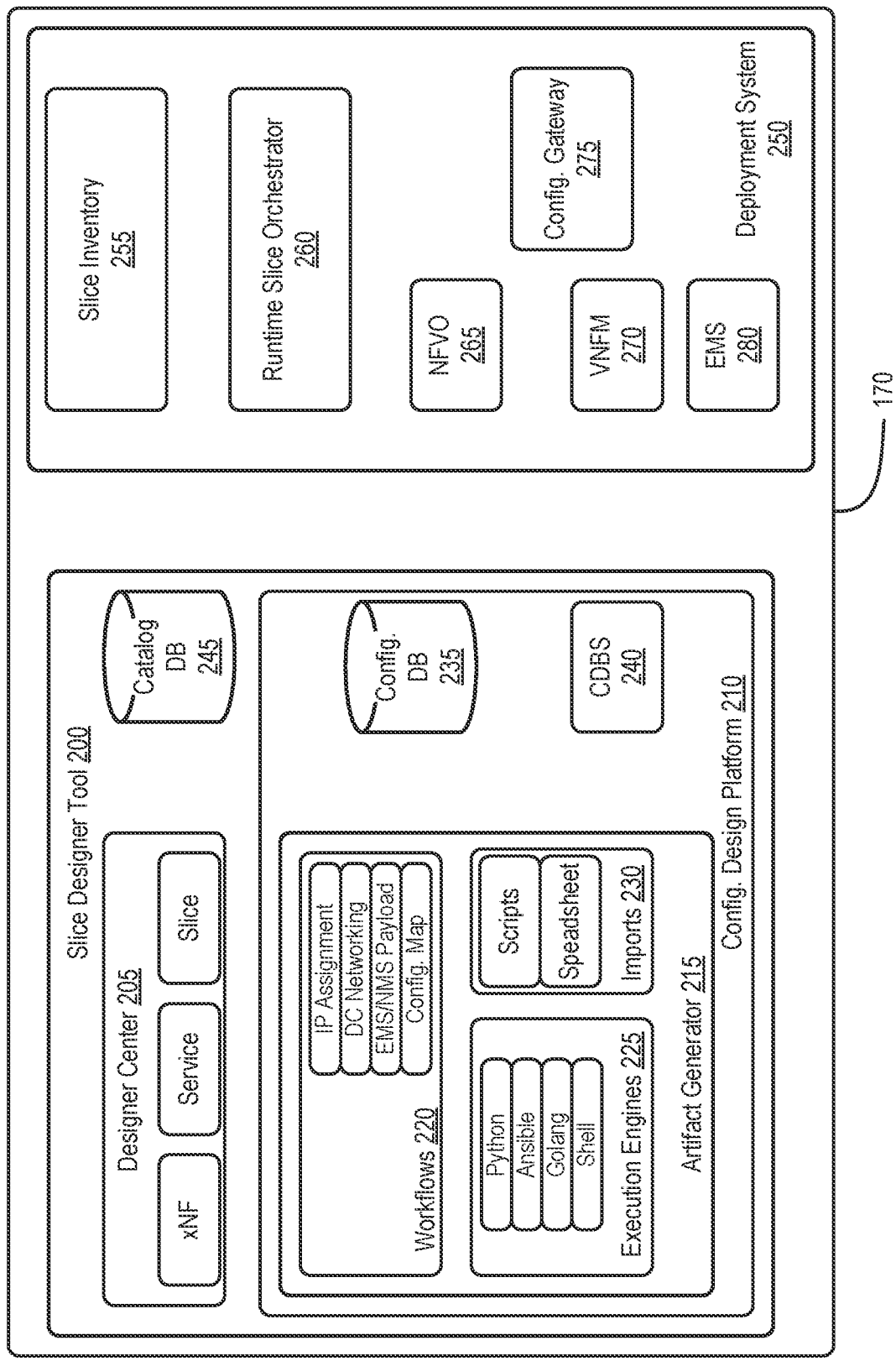
FIG. 2 is a diagram illustrating a slice orchestration platform.

FIG. 2 is a diagram illustrating slice orchestration platform 170 in which an automated slice configuration service may be implemented. As illustrated in FIG. 2, slice orchestration platform 170 may include a slice designer tool 200 and a deployment system 250.

Slice designer tool 200 may incorporate design time functions to generate an instance-specific configuration design or a deployment-agnostic configuration design. Slice designer tool 200 may receive vendor NF packages, via onboarding portal 160, for which network resources can then be designed and configured.

As referred to herein, an "instance-specific configuration design" is applicable for a network slice where all configuration aspects are known prior to deployment. For example, an instance-specific configuration design may be appropriate for an enterprise using a data center in a certain location. As referred to herein, a "deployment-agnostic configuration design" may be applicable for a network slice where some configuration aspects are not known prior to NF instantiation. For example, network slices incorporating a virtualized control unit (vCU) or virtualized distributed unit (vDU) of a gNodeB in developing coverage areas may be candidates for deployment-agnostic slice design. Location or site-specific information for a NF deployment may be applied to workflows in a slice design to generate "artifacts." An instance-specific configuration design may include the necessary site-specific artifacts to enable immediate deployment (e.g., by deployment system 250). By contrast, site-specific artifacts may need to be supplied for a deployment-agnostic configuration design prior to deployment.

According to one implementation, slice designer tool 200 generally stores workflows for Configuration Information Questionnaire (CIQ) automation and receives vendor NF packages. A CIQ typically lists possible NF or service attributes, which a vendor can select for setting on a per-site basis or a per-feature basis. Via the CIQ, slice designer tool 200 obtains site information for an instance of the vendor NF and generates site-specific artifacts for the NF package based on the workflows and the site information. The slice designer tool 200 may associate the site-specific artifacts with a configuration design for the NF package. As described further below, if site-specific information for a NF deployment is available at the design stage, slice designer tool 200 may associate the site-specific artifacts with a configuration design to generate and store an instance-specific configuration design. When site-specific information for a NF deployment is not available at the design stage, slice designer tool 200 may automatically generate the site-specific artifacts for the NF package during a deployment process for use by deployment system 250.

As shown in FIG. 2, slice designer 200 may include a design center 205, a configuration design platform 210, and a catalog database 245. Design center 205 may include a platform for designers (e.g., human operators) to design slice components, including xNF designs, service designs, and slice designs. An xNF design may include a VNF or CNF that may be used to support a service. A service design may be an assembly of multiple xNFs to support a given application or set of requirements for a network service. A slice design may be an end-to-end network path of network components and/or services. A resultant product from design center 205 may be a final slice service package that contains ingredients such as service, NFs, and associated slice configurations applicable to each NF that makes up a slice. In one implementation, the final slice service package may be a TOSCA cloud services archive (CSAR) package (e.g., a ZIP file). Besides the slice template, the CSAR may include all artifacts required to manage the lifecycle of the corresponding cloud application (e.g., implementation artifacts of the operations of the node types), as well as all artifacts to execute the cloud application (e.g., deployment artifacts). Configuration design may be performed on the basis of a slice functioning in a particular environment (e.g., a site-specific configuration), such a particular data center for a network function virtualization infrastructure (NFVI) and/or a cloud computing platform. In order to enable the execution and management of the lifecycle of a slice in a certain environment, all corresponding artifacts from the CSAR must be available in that environment.

Configuration design platform 210 may allow configuration inputs for use in automating slice orchestration, eliminating the need for a manual step to make a slice deployment site-specific. More particularly, configuration design platform 210 may solicit and store settings in a generalized configuration database (e.g., configuration database 235) for runtime slice orchestration components to resolve NF and slice configuration on-demand during NF instantiation. Configuration design platform 210 may include an artifact generator 215, a configuration database 235, and a configuration database service (CDBS) 240.

Artifact generator 215 may generally include a computing device, functions, and/or storage to automate generation of site-specific artifacts, such as deployment artifacts (e.g., images, installables) and implementation artifacts (e.g., services, scripts) generated from CSAR packages. According to an implementation, artifact generator 215 may include workflows 220, execution engines 225, and imports 230.

Workflows 220 may be designed, uploaded, and stored in artifact generator 215 to enable CIQ automation in configuration design platform 210. Workflows 220 may supply configuration parameters for NFs with deployment-agnostic slice design. Workflows 220 may include, for example, workflows for IP assignment, data center (DC) networking, element management system (EMS)/network management system (NMS) payload configurations, Kubernetes configuration maps, etc.

Execution engines 225 may run workflows 220 to generate site-specific artifacts for slice configurations. Execution engines 225 may use one or more programing or automation languages, such as PYTHON, GO (or Golang), ANSIBLE, Shell, etc.

Imports 230 may include a memory or database to receive site specific information and/or CIQ data from external sources. For example, imports 230 may interface with external databases in a distributed architecture to obtain site-specific information in the form of scripts, spreadsheets, or another type of file.

Configuration database 235 provides a hosting mechanism to store and collate site-specific configuration artifacts, such as artifacts obtained from artifact generator 215. According to an implementation, site-specific artifacts for different sites may be associated with a single NF package and/or slice template. Configuration database 235 may interface with design center 205 and/or catalog database 245 to provide stored artifacts for instance-specific configuration designs. Additionally or alternatively, configuration database 235 may interface with CDBS 240 to provide site-specific artifacts for instantiation of deployment-agnostic slice designs at runtime.

CDBS 240 may include a computing device or function to manage on-demand configuration resolution workflows at runtime. More particularly, CDBS 240 provide an interface between configuration design platform 210 and runtime slice orchestrator (RSO) 260 to generate site-specific configuration artifacts for instantiation of deployment-agnostic slice designs. Upon receiving a request from RSO 260 with particular site information and slice template identifiers, CDBS 240 may activate artifact generator 215 to execute workflows to automatically generate corresponding site-specific artifacts and serve the generated artifacts back to RSO 260.

Catalog database 245 may include a catalog of network slice configuration designs, including instance-specific configuration designs (e.g., a CSAR with site-specific artifacts) and deployment-agnostic configuration designs (e.g., network slice templates without site-specific artifacts). According to an implantation, each network slice configuration design may include a unique slice template identifier.

Deployment system 250 may include one or more computer devices, such as server devices, to deploy VNFs in core network 150 and/or access network 120, and/or to configure the deployed VNFs to implement network slices. As shown in FIG. 2, deployment system 250 may include a slice inventory 255, a runtime slice orchestrator 260, a network function virtualization orchestrator (NFVO) 265, a virtual network function manager (VNFM) 270, a configuration gateway 275, and an element management system (EMS) 280.

Slice inventory 255 may include memory or database with an inventory of active (e.g., instantiated) slices associated with network environment 100. Entries in slice inventory 255 may be updated, for example, in real time by runtime slice orchestrator 260.

Runtime slice orchestrator 260 may manage creation of network slices using information from slice designer tool 200. Runtime slice orchestrator 260 may receive instructions/requests from an operator (e.g., an application operations team) or an onboarding system (e.g., onboarding portal 160) to instantiate a network slice. As described further herein, runtime slice orchestrator 260 may automate sequences of activities, tasks, rules, and policies needed for on-demand creation, modification, or removal of network slices. Runtime slice orchestrator 260 may provide orchestration at a high level, with an end-to-end view of the infrastructure, networks (e.g., access network 120 and core network 150), and applications. Runtime slice orchestrator 260 may be responsible for implementing instructions to instantiate, allocate, and activate network slices. Similarly, runtime slice orchestrator 260 may be responsible for implementing instructions to deactivate, deallocate, and tear down network slices. According to one implementation, runtime slice orchestrator 260 may communicate with CDBS 240 to request site-specific artifacts for a NF package (e.g., a deployment-agnostic configuration design) deployment at runtime.

NFVO 265 may create, remove, and/or update network functions, such as virtualized versions of core components (e.g., AMF, SMF, UPF, etc.) at a particular site (e.g., a data center, enterprise, MEC, etc.).

VNFM 270 may manage VNFs. VNFM 270 may perform lifecycle management of particular VNFs, including instantiation, scaling, updating, and/or termination of particular VNFs based on instructions received from runtime slice orchestrator 260.

Configuration gateway 275 includes, or is executed by, a network device that acts as a gateway between RSO 260 and a site-specific EMS 280, and forwards provisioning instructions to EMS 280. Though only a single configuration gateway 275 is shown in FIG. 2, slice orchestration platform 170 may include multiple configuration gateways 275 disposed at various geographic locations in network environment 100.

EMS 280 may manage a VNF, which may include the implementation of particular network functions at particular locations/sites. For example, in access network 120, a first VNF may correspond to a virtualized gNodeB, a second VNF may correspond to a virtualized UPF, a third VNF may correspond to a virtualized AMF, etc.

Although FIG. 2 shows exemplary components of slice orchestration platform 170, in other implementations, slice orchestration platform 170 may include fewer components, different components, additional components, or differently arranged components than depicted in FIG. 2. Additionally or alternatively, one or more components of slice orchestration platform 170 may perform one or more tasks described as being performed by one or more other components of slice orchestration platform 170.

Figure 3:
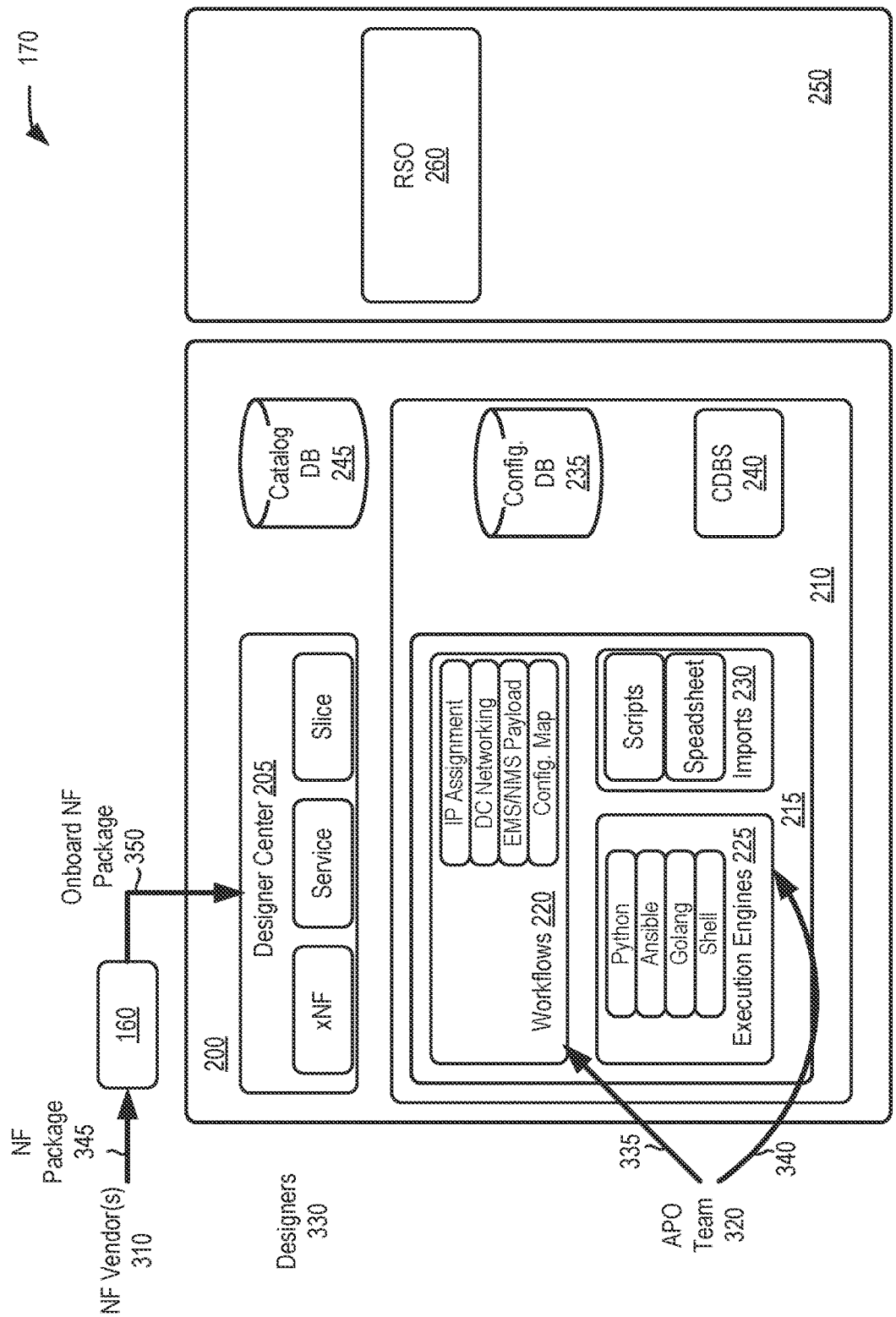
FIG. 3 is a diagram illustrating exemplary preparatory communications to implement the automated slice configuration service.

FIG. 3 is a diagram illustrating preparatory communications to implement the automated slice configuration service in slice orchestration platform 170. As further indicated in FIG. 3, slice orchestration platform 170 may receive direct or indirect input from NF vendors 310, application operations (APO) team 320, and/or designers 330.

At references 335 and 340, APO team 320 may upload to configuration design platform 210 workflows, scripts, and CIQ data needed to perform CIQ automation within slice designer tool 200. For example, uploaded information may include a list of possible attributes that could be set on a per site basis.

NF vendor 310 may upload NF packages 345 to onboarding portal 160. For example, onboarding portal 160 may provide a structured interface to allow vendors to submit policies and requirements for a NF. At reference 350, onboarding portal 160 may onboard the NF Packages to design center 205 of slice designer tool 200.

Figure 4:
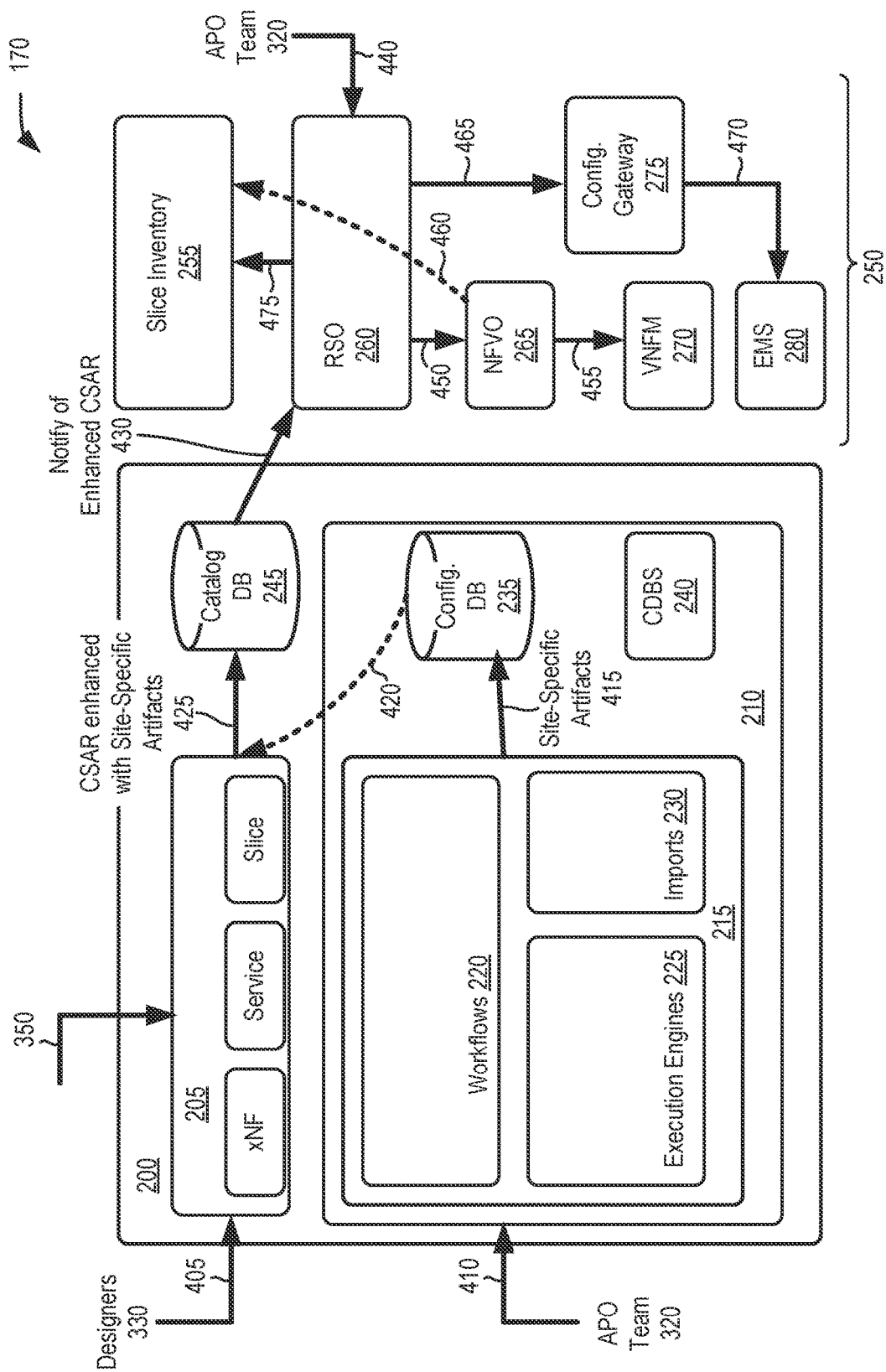
FIG. 4 is a diagram illustrating exemplary communications to implement an instance-specific design and deployment in a slice orchestration platform.

FIG. 4 is a diagram illustrating communications to implement an instance-specific design and deployment in slice orchestration platform 170. Generally, communications of FIG. 4 may be performed at some time after communications in FIG. 3 are completed. Communications in FIG. 4 relate to preplanned slice provisioning.

As indicated at reference 405, designers 330 may use design center 205 to create a service for a specific site, including xNF designs, service designs, and slice designs for the NF packages that were on-boarded at reference 345.

At reference 410, APO team 320 may upload to artifact generator 215 site-specific CIQ data and initiate a design workflow in slice designer tool 200. Site-specific CIQ data may include, for example, IP ranges allocated for a specific deployment site, uniform resource locators (URLs)/endpoints of peering systems according to the deployment site, deployment flavor such as simplex, medium, high availability (HA), etc., according to the capacity of a selected data center.

At reference 415, slice designer tool 200 (e.g., artifact generator 215) may perform automation to apply the uploaded site-specific CIQ data to workflows and generate site-specific configuration artifacts. Artifact generator 215 may persist (or store) the final site-specific configuration artifacts in configuration database 235. Site specific artifacts 460 may include, for example, the VNF descriptor (VNFD) with Day-0 configuration or values, a YAML file in the case of containerized network functions, etc. Site specific artifacts 460 may also include files such as netconf/YANG configurations or cloud-initialization files which should be applied to a NF.

At reference 420, slice designer tool 200 may retrieve, from configuration database 235, the site specific configuration artifacts and associate them with the corresponding configuration design for NF package 350. At reference 425, slice designer tool 200 may package, in catalog database 245, a final service CSAR, which is enhanced with the site-specific configuration artifacts retrieved from configuration database 235. Along with the site-specific configuration artifacts, the CSAR provides a template of the network service and the scripts the VNF needs for its lifecycle. The final service CSAR with the site-specific configuration artifacts may correspond to an instance-specific configuration design, described above.

At reference 430, slice designer tool 200 notifies RSO 260 of the completed design and distributes the final enhanced CSAR. Thus, as summarized at references 440-475, deployment system/RSO 260 is subsequently able to perform end-to-end slice deployment along with slice configuration directly (e.g., "zero-touch provisioning"), since the distributed design contains site-specific customization.

At reference 440, APO team 320 may trigger RSO 260 to deploy the slice by specifying a service template ID and site. In response, at reference 450, RSO 260 may retrieve (e.g., either locally or from catalog DB 245) site-specific configuration artifacts to trigger NFVO 265 for deployment. In response, at reference 455, NFVO 265 may send instructions to VNFM 270 to perform the deployment. Additionally, at reference 460, NFVO 265 may update the NF instance records in slice inventory 255.

At reference 465, RSO 260 may use site-specific configuration EMS/NMS payload and trigger configuration gateway 275 for slice provisioning. Configuration gateway 275, at reference 470, may direct EMS 280 to instantiate particular network functions for the network slice. Upon successful instantiation of the network slice, at reference 475, RSO 260 may update the service instance records for slice inventory 255.

Figure 5:
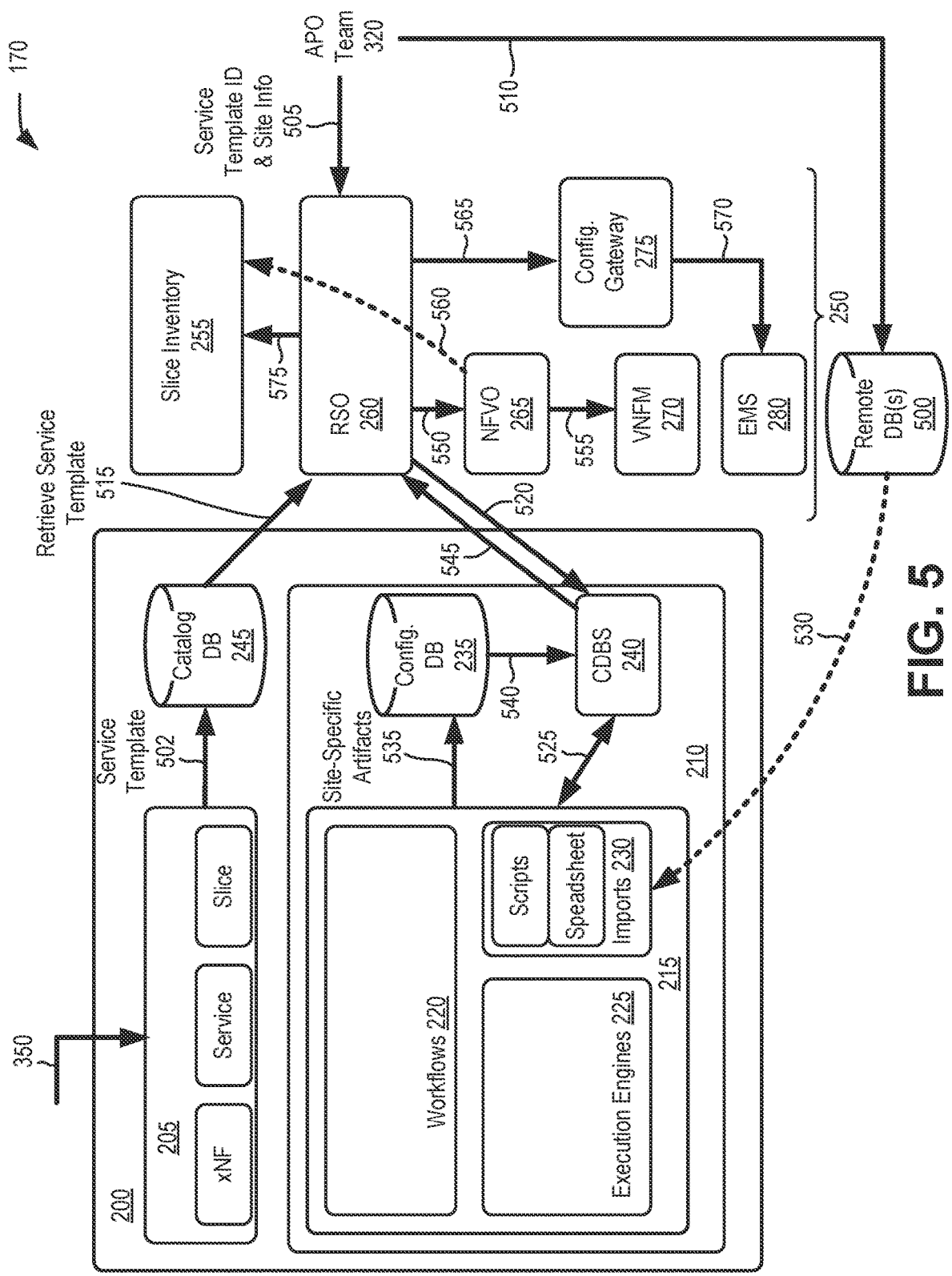
FIG. 5 is a diagram illustrating exemplary communications to implement deployment-agnostic slice design and deployment in a slice orchestration platform.

FIG. 5 is a diagram illustrating communications to implement deployment-agnostic slice design and deployment in slice orchestration platform 170. Generally, communications of FIG. 5 may be performed at some time after communications in FIG. 3 are completed. Communications in FIG. 5 relate to on-demand slice provisioning.

As indicated at reference 502, an on-boarded NF package (from reference 345) may be assigned a service template that does not include the site-specific artifacts necessary for deployment. The service template for the NF package may be stored in catalog DB 245.

As shown at reference 505, APO team 320 may trigger RSO 260 to perform CIQ automation by specifying a service template ID and site-specific information. Additionally, at reference 510 the APO team may populate the CIQ in external DB s/location 500 according to existing processes and/or user input. This step provides flexibility such that a design template may be customized for a given site at later point in time when the information becomes available, but not using a different tool for this approach. For example, as virtual DUs (vDUs) are deployed in new locations during expansion of a mobile network, it is not possible to design a location-specific vDU configuration for unbuilt locations, since site specific parameters may not be known until the vDU becomes available. Using the slice designer tool 200, a designer may be able to create a generic template which an APO team can later re-use for deployment agnostic approaches.

At reference 515, RSO 260 may retrieve the service template corresponding to the template ID provided by the APO team. Alternatively, RSO 260 may receive and store the service template prior to the APO team triggering deployment. The service template may correspond to a deployment-agnostic configuration design described above. Since the service template does not include site-specific artifacts, at reference 520, RSO 260 may send a request to CDBS 240 to start an on-demand configuration resolution workflow in configuration design platform 210. The request may include a CIQ reference and NF template reference from the service template.

CDBS 240 may receive the request from RSO 260 and, at reference 525, CDBS 240 may start the on-demand configuration resolution workflow. For example, CDBS 240 may use the CIQ reference and NF template reference from the slice instantiation reference to identify appropriate workflows 220 in artifact generator 215.

At reference 535, slice designer tool 200 may perform configuration design automation by executing applicable NF application scripts/Ansible (e.g., RedHat automation) playbooks, etc., from workflows 220 and may store final site-specific configuration artifacts in configuration database 235. As part of the configuration design automation, slice designer tool 200 may provide execution context for the scripts/playbook to run. A designer may design a configuration resolution workflow (e.g., FIG. 3, ref. 335), and this workflow may execute and connect different tasks output to generate final site-specific configuration artifacts.

Additionally, or alternatively, at reference 530, slice designer tool 200 (e.g., artifact generator 215) may import some or all site-specific configuration artifacts from external DBs 500, if applicable from reference 510. For example, slice designer tool 200 may offer platform capability to contact IP Address Management (IPAM) and import from external DBs 500.

At reference 540, CDBS 235 may download the final site-specific configuration artifacts, and, at reference 545, forward the artifacts to RSO 260.

At reference 550, RSO 260 may use the site-specific configuration artifacts to trigger NFVO 265 for deployment. The remainder of the deployment process may continue through deployment system 250 as shown in references 555-575 in a manner similar to references 455-475 described above.

Although FIGS. 3-5 illustrate exemplary communications for operating the automated slice configuration service, according to other exemplary embodiments, additional, different, and/or fewer communication may be used.

Figure 6:
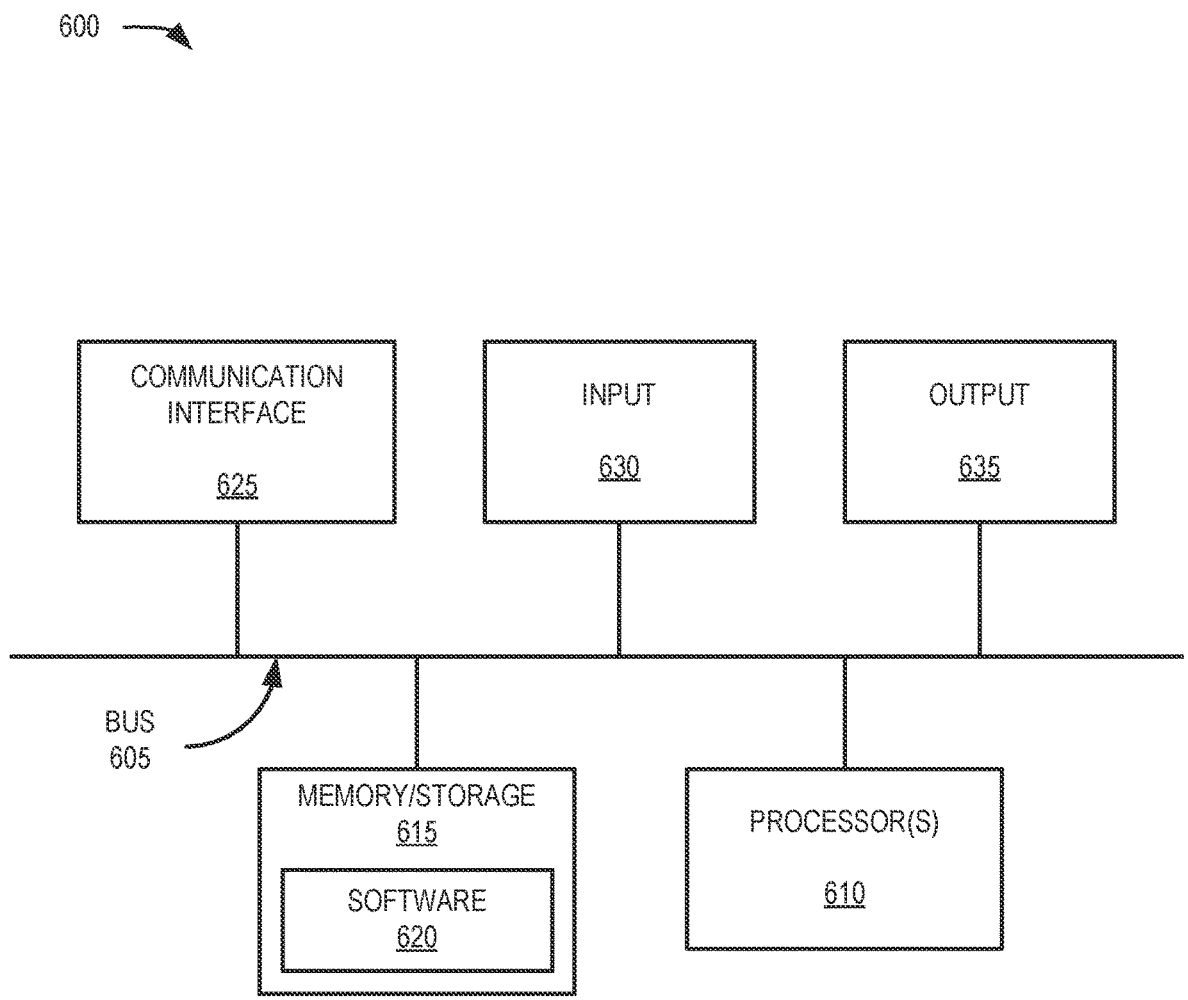
FIG. 6 is a diagram illustrating exemplary components of a device that may correspond to one or more of the devices described herein.

FIG. 6 is a diagram illustrating exemplary components of a device 600 that may correspond to one or more of the devices described herein. For example, device 600 may correspond to components included in access network 120, MEC network 150, core network 150, onboarding portal 160, slice orchestration platform 170, and/or other elements illustrated in FIGS. 1-5. As illustrated in FIG. 6, according to an exemplary embodiment, device 600 includes a bus 605, one or more processors 610, memory/storage 615 that stores software 620, a communication interface 625, an input 630, and an output 635. According to other embodiments, device 600 may include fewer components, additional components, different components, and/or a different arrangement of components than those illustrated in FIG. 6 and described herein.

Bus 605 includes a path that permits communication among the components of device 600. For example, bus 605 may include a system bus, an address bus, a data bus, and/or a control bus. Bus 605 may also include bus drivers, bus arbiters, bus interfaces, and/or clocks.

Processor 610 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc. Processor 610 may be a dedicated component or a non-dedicated component (e.g., a shared resource).

Processor 610 may control the overall operation or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.). Processor 610 may perform an operation and/or a process based on various techniques including, for example, multithreading, parallel processing, pipelining, interleaving, etc.

Memory/storage 615 includes one or multiple memories and/or one or multiple other types of storage mediums. For example, memory/storage 615 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 615 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 615 may include a drive for reading from and writing to the storage medium.

Memory/storage 615 may be external to and/or removable from device 600, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 615 may store data, software, and/or instructions related to the operation of device 600.

Software 620 includes an application or a program that provides a function and/or a process. Software 620 may include an operating system. Software 620 is also intended to include firmware, middleware, microcode, hardware description language (HDL), and/or other forms of instruction. For example, according to an implementation, software 620 may implement portions of slice orchestration platform 170.

Communication interface 625 permits device 600 to communicate with other devices, networks, systems, devices, and/or the like. Communication interface 625 includes one or multiple wireless interfaces and/or wired interfaces. For example, communication interface 625 may include one or multiple transmitters and receivers, or transceivers (e.g., radio frequency transceivers). Communication interface 625 may include one or more antennas. For example, communication interface 625 may include an array of antennas. Communication interface 625 may operate according to a protocol stack and a communication standard. Communication interface 625 may include various processing logic or circuitry (e.g., multiplexing/de-multiplexing, filtering, amplifying, converting, error correction, etc.).

Input 630 permits an input into device 600. For example, input 630 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 635 permits an output from device 600. For example, output 635 may include a speaker, a display, a light, an output port, and/or some other type of visual, auditory, tactile, etc., output component. According to some embodiments, input 630 and/or output 635 may be a device that is attachable to and removable from device 600.

Device 600 may perform a process and/or a function, as described herein, in response to processor 610 executing software 620 stored by memory/storage 615. By way of example, instructions may be read into memory/storage 615 from another memory/storage 615 (not shown) or read from another device (not shown) via communication interface 625. The instructions stored by memory/storage 615 cause processor 610 to perform a process described herein. Alternatively, for example, according to other implementations, device 600 performs a process described herein based on the execution of hardware (processor 610, etc.).

Figure 7:
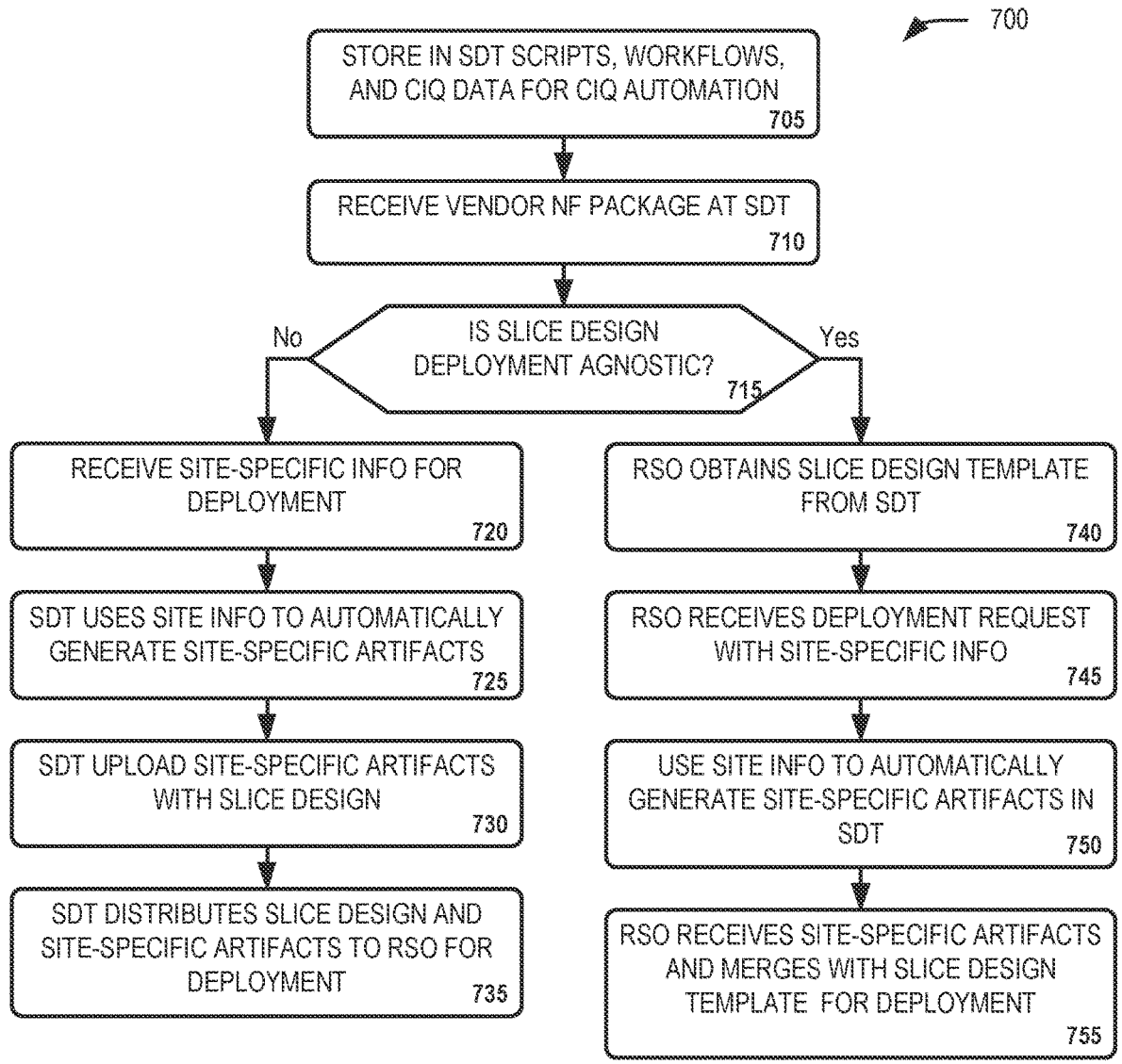
FIG. 7 is a flow diagram illustrating an exemplary process for performing automated slice configuration, according to an implementation described herein.

FIG. 7 is a flow diagram illustrating an exemplary process 700 for performing automated slice configuration, according to an implementation described herein. In one implementation, process 700 may be implemented by components of slice orchestration platform 170. In another implementation, process 700 may be implemented by slice orchestration platform 170 in conjunction with one or more other devices in network environment 100.

Process 700 may include storing, in a slice design tool (SDT), scripts, workflows, and CIQ data for CIQ automation (block 705) and receiving a vendor NF package at the SDT (block 710). For example, an engineer may upload to configuration design platform 210 workflows, scripts, and CIQ data needed to perform CIQ automation within slice designer tool 200. Separately, using onboarding portal 160, a vendor may upload an NF package, which may be on boarded to slice designer tool 200. The NF package may be used to configure a network slice design.

If the slice design is instance specific (block 715-No), process 700 may include receiving site-specific information for deployment (block 720), using the site information to automatically generate site-specific artifacts (block 725), uploading the site-specific artifacts with a final VNF package (block 730), and distributing the slice design and the site-specific artifacts to an RSO 260 for deployment (block 735). For example, slice designer tool 200 may obtain from a designer or the vendor site information for deployment of an instance of the vendor NF, such as a particular data center, area, or location. Slice designer tool 200 may generate site-specific artifacts for the NF package based on the workflows and the site information. Slice designer tool 200 may combine a configuration design for the NF package and the site-specific artifacts as a deployment package (e.g., an instance-specific configuration design) and notify RSO 260 of the deployment package.

If the slice design is deployment agnostic (block 715-Yes), process 700 may include obtaining a slice design template from the SDT (block 740), receiving a deployment request with site-specific information (block 745), using the site information to automatically generate site-specific artifacts in the SDT (block 750), and receiving the site-specific artifacts and merging the artifacts with the slice design template for deployment (block 755). For example, slice designer tool 200 may be used to generate a deployment-agnostic configuration design based on the NF package and notify RSO 260 of the deployment-agnostic configuration design. RSO 260 may receive a deployment request (e.g., from an engineer or a network device) that includes a template ID and site information. The template ID may refer to a deployment-agnostic configuration design for the network slice. As part of the deployment trigger, the APO team may indicate where (e.g., at what location, data center, area, etc.) to deploy the slice. RSO 260 may provide a request to CDBS 240 for site-specific artifacts for the corresponding configuration design. In response, slice designer tool 200 may generate site-specific artifacts for the NF package based on the workflows and the site information and forward the site-specific artifacts for the NF package to RSO 260. RSO 260 may receive the site-specific artifacts for the NF package and trigger instantiation of the NF functions using the site-specific artifacts and the slice template.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 7, and message/operation/deployment flows with respect to FIGS. 3-5, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    storing, by a network device in a design platform, workflows for Configuration Information Questionnaire (CIQ) automation;
    receiving, by the network device and via the CIQ, a vendor network function (NF) package that includes a deployment-agnostic configuration or an instance-specific configuration;
    when the vendor NF package includes the deployment-agnostic configuration:
        obtaining, by a deployment system and from the network device, a slice design template for the vendor NF package,
        receiving, at the deployment system, a deployment request including an identifier for the slice design template and first site information for an instance of the vendor NF package,
        providing, by the deployment system and to the network device, a request to perform an on-demand configuration resolution workflow, wherein the request includes a CIQ reference and an NF template reference from the slice design template,
        generating, by the network device and in response to the request, first site-specific artifacts for the vendor NF package based on the workflows and the first site information in the deployment request, and
        associating, by the network device, the first site-specific artifacts with the slice design template for the vendor NF package for deployment; and
    when the vendor NF package includes the instance-specific configuration:
        receiving, by the network device, second site information for deployment of the vendor NF package,
        automatically generating by the network device and based on the workflows and second site information, second site-specific artifacts for the vendor NF package, and
        providing, by the network device and to the deployment system, a deployment package including the slice design with the second site-specific artifacts.

2. The method of claim 1, further comprising:
    storing, in a database, a catalog of instance-specific configurations and deployment-agnostic configurations; and
    assigning a unique slice template identifier to each of the instance-specific configurations and deployment-agnostic configurations.

3. The method of claim 1, wherein receiving the second site information includes:
    receiving the second site information during an NF design phase.

4. The method of claim 1, wherein receiving the first site information includes:

receiving the first site information from an orchestration device during a slice deployment process.

5. The method of claim 1, further comprising:
storing, by the network device, the first site-specific artifacts and the slice design template as a deployment package; and
notifying, by the network device, an orchestration device of the deployment package.

6. The method of claim 5, wherein the first site-specific artifacts and the slice design template form an automated provisioning package.

7. The method of claim 1, further comprising:
storing, by the network device, the second site-specific artifacts separately from the slice design template for the vendor NF package.

8. The method of claim 7, further comprising:
forwarding, by the network device, the second site-specific artifacts to an orchestration device during a slice deployment process.

9. The method of claim 1, further comprising:
storing, in a database, a catalog of instance-specific configurations and deployment-agnostic configurations.

10. A network device, comprising:
a processor configured to:
store workflows for Configuration Information Questionnaire (CIQ) automation;
receive, via the CIQ, a vendor network function (NF) package that includes a deployment-agnostic configuration or an instance-specific configuration;
when the vendor NF package includes the deployment-agnostic configuration:
provide, to a deployment system, a slice design template for the vendor NF package,
receiving, from the deployment system, a request to perform an on-demand configuration resolution workflow, wherein the request includes a CIQ reference and an NF template reference from the slice design template,
generate, in response to the request, first site-specific artifacts for the vendor NF package based on the workflows and first site information in the request, and
associate the first site-specific artifacts with the slice design template for the vendor NF package for deployment; and
when the vendor NF package includes the instance-specific configuration:
receive second site information for deployment of the vendor NF package,
automatically generate, based on the workflows and second site information, second site-specific artifacts for the vendor NF package, and
provide, to the deployment system, a deployment package including the slice design with the second site-specific artifacts.

11. The network device of claim 10, wherein the processor is further configured to:
store, in a database, a catalog of instance-specific configurations and deployment-agnostic configurations;
assigning a unique slice template identifier to each of the instance-specific configurations and deployment-agnostic configurations.

12. The network device of claim 10, wherein the processor is further configured to:
store, in a database, a catalog of instance-specific configurations and deployment-agnostic configurations.

13. The network device of claim 10, wherein, when receiving the second site information, the processor is further configured to:
receive the site second information from a designer during an NF design phase.

14. The network device of claim 10, wherein, when receiving the second site information, the processor is further configured to:
receive the second site information from an orchestration device during a slice deployment process.

15. The network device of claim 10, wherein the processor is further configured to:
store the first site-specific artifacts and the slice design template as a deployment package.

16. The network device of claim 10, wherein the processor is further configured to:
store the second site-specific, artifacts separately from the configuration design for the vendor NF package.

17. A non-transitory computer-readable medium containing instructions executable by at least one processor, the computer-readable medium comprising one or more instructions for:
storing, in a design platform, workflows for Configuration Information Questionnaire (CIQ) automation;
receiving, via the CIQ, a vendor network function (NF) package that includes a deployment-agnostic configuration or an instance-specific configuration;
when the vendor NF package includes the deployment-agnostic configuration:
providing, to a deployment system, a slice design template for the vendor NF package,
receiving, from the deployment system, a request to perform an on-demand configuration resolution workflow, wherein the request includes a CIQ reference and an NF template reference from the slice design template,
generating, in response to the request, first site-specific artifacts for the vendor NF package based on the workflows and first site information in the request, and
associating the first site-specific artifacts with the slice design template for the vendor NF package for deployment; and
when the vendor NF package includes the instance-specific configuration:
receiving second site information for deployment of the vendor NF package,
automatically generating, based on the workflows and second site information, second site-specific artifacts for the vendor NF package, and
providing, to the deployment system, a deployment package including the slice design with the second site-specific artifacts.

18. The non-transitory computer-readable medium of claim 17, further comprising one or more instructions for:
storing, in a database, a catalog of instance-specific configurations and deployment-agnostic configurations; and
assigning a unique slice template identifier to each of the instance-specific configurations and deployment-agnostic configurations.

19. The non-transitory computer-readable medium of claim 17, further comprising one or more instructions for:
storing, in a database, a catalog of instance-specific configurations and deployment-agnostic configurations.

20. The non-transitory computer-readable medium of claim 17, wherein the instructions for receiving the second site information further comprise one or more instructions for:
    receiving the second site information from a designer during an NF design phase.

* * * * *